(12) United States Patent
Clough et al.

(10) Patent No.: US 11,752,749 B2
(45) Date of Patent: Sep. 12, 2023

(54) COMPOSITE ARTICLE INCLUDING A MULTILAYER BARRIER ASSEMBLY AND METHODS OF MAKING THE SAME

(71) Applicant: 3M INNOVATIVE PROPERTIES COMPANY, St. Paul, MN (US)

(72) Inventors: Robert S. Clough, St. Paul, MN (US); Joseph C. Spagnola, Woodbury, MN (US); Christopher S. Lyons, St. Paul, MN (US); Mark D. Weigel, Hugo, MN (US); Thomas P. Klun, Lakeland, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 150 days.

(21) Appl. No.: 17/301,873

(22) Filed: Apr. 16, 2021

(65) Prior Publication Data

US 2021/0268782 A1  Sep. 2, 2021

Related U.S. Application Data

(63) Continuation of application No. 15/753,027, filed as application No. PCT/US2016/047514 on Aug. 18, 2016.

(Continued)

(51) Int. Cl.
*B32B 27/36* (2006.01)
*B32B 27/30* (2006.01)
(Continued)

(52) U.S. Cl.
CPC ............. *B32B 27/36* (2013.01); *B32B 27/08* (2013.01); *B32B 27/308* (2013.01);
(Continued)

(58) Field of Classification Search
None
See application file for complete search history.

(56) References Cited

U.S. PATENT DOCUMENTS 3,444,129 A  5/1969  Young, Jr.
3,460,961 A  8/1969  Young, Jr.
(Continued)

FOREIGN PATENT DOCUMENTS

JP  2003-335820  11/2003
JP  2012-098606  5/2012
(Continued)

OTHER PUBLICATIONS

Wada—CIGS solar cells—Sol.Ener.Mat.—2001 (Year: 2001).*
(Continued)

*Primary Examiner* — John Vincent Lawler
(74) *Attorney, Agent, or Firm* — 3M Innovative Properties Company (57) ABSTRACT

A composite article includes a multilayer barrier assembly bonded to a substrate, and a top polymer layer bonded to the multilayer barrier assembly opposite the substrate. The multilayer barrier assembly comprises a base polymer layer and a base inorganic barrier layer. The base polymer layer comprises a polymerized reaction product of polymerizable components comprising at least one di(meth)acrylate represented by the formula (Continued)

-continued

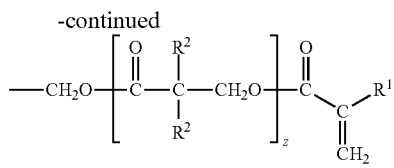

Each $R^1$ independently represents H or methyl; each $R^2$ independently represents an alkyl group having from 1 to 4 carbon atoms; $x=0, 1, 2, 3,$ or 4; and $z=0, 1, 2, 3,$ or 4, with the provisos that at least one of x and z is not zero and $1 \leq x+z \leq 4$. Methods of making the same are also disclosed.

20 Claims, 1 Drawing Sheet

Related U.S. Application Data (60) Provisional application No. 62/206,978, filed on Aug. 19, 2015.

(51) Int. Cl.
  *C08F 222/10* (2006.01)
  *B32B 27/08* (2006.01)
  *C08K 5/053* (2006.01)
  *C08L 67/07* (2006.01)

(52) U.S. Cl.
  CPC .............. *C08F 222/10* (2013.01); *C08K 5/053* (2013.01); *C08L 67/07* (2013.01); *B32B 2255/10* (2013.01); *B32B 2255/20* (2013.01); *C08L 2203/16* (2013.01); *C08L 2203/204* (2013.01)

(56) References Cited

U.S. PATENT DOCUMENTS

| | | | |
|---|---|---|---|
| 3,503,779 A | 3/1970 | Young, Jr. | |
| 3,492,261 A | 6/1970 | Young, Jr | |
| 4,536,588 A | 8/1985 | Yokoshima | |
| 4,696,719 A | 9/1987 | Bischoff | |
| 4,722,515 A | 2/1988 | Ham | |
| 4,842,893 A | 6/1989 | Yializis | |
| 4,954,371 A | 9/1990 | Yializis | |
| 5,018,048 A | 5/1991 | Shaw | |
| 5,032,461 A | 7/1991 | Shaw | |
| 5,097,800 A | 3/1992 | Shaw | |
| 5,125,138 A | 6/1992 | Shaw | |
| 5,440,446 A | 8/1995 | Shaw | |
| 5,547,908 A | 8/1996 | Furuzawa | |
| 5,688,601 A | 11/1997 | Usifer | |
| 5,877,895 A | 3/1999 | Shaw | |
| 6,010,751 A | 1/2000 | Shaw | |
| 6,045,864 A | 4/2000 | Lyons | |
| 6,214,422 B1 | 4/2001 | Yializis | |
| 6,231,939 B1 | 5/2001 | Shaw | |
| 6,306,507 B1 | 10/2001 | Brunelle | |
| 6,413,645 B1 | 7/2002 | Graff | |
| 6,878,400 B2 | 4/2005 | Colombo | |
| 7,018,713 B2 | 3/2006 | Padiyath | |
| 7,486,019 B2 | 2/2009 | Padiyath | |
| 9,540,526 B2 | 1/2017 | Nishio | |
| 2003/0054170 A1 | 3/2003 | Fujimoto | |
| 2004/0191550 A1 | 9/2004 | Maekawa | |
| 2004/0253428 A1 | 12/2004 | Wang | |
| 2006/0211835 A1 | 9/2006 | Baumgart | |
| 2009/0081447 A1* | 3/2009 | Wakizaka | C09D 133/16 428/323 |
| 2009/0324870 A1* | 12/2009 | Ito | G11B 7/2542 526/318.2 |
| 2010/0067347 A1 | 3/2010 | Ito | |
| 2010/0272933 A1 | 10/2010 | Mccormick | |
| 2011/0027553 A1 | 2/2011 | Enniss | |
| 2012/0003448 A1 | 1/2012 | Weigel | |
| 2013/0323519 A1* | 12/2013 | Klun | B32B 27/08 204/192.1 |
| 2013/0327399 A1* | 12/2013 | Takanashi | H01L 31/049 427/407.1 |
| 2015/0043071 A1 | 2/2015 | Hatanaka | |

FOREIGN PATENT DOCUMENTS

| | | | | |
|---|---|---|---|---|
| JP | 2012/184344 | * | 9/2012 | ............ C08F 220/12 |
| JP | 2012-184344 | | 9/2012 | |
| JP | 2013/115059 | * | 6/2013 | ............ H01L 31/042 |
| WO | WO 2000-26973 | | 5/2000 | |
| WO | WO 2000-61664 | | 10/2000 | |
| WO | WO 2006-138198 | | 12/2006 | |
| WO | WO 2008-151286 | | 12/2008 | |
| WO | WO 2012-106184 | | 8/2012 | |
| WO | WO 2014-025384 | | 2/2014 | |
| WO | WO 2014-025385 | | 2/2014 | |
| WO | WO 2014-025386 | | 2/2014 | |
| WO | WO 2014-025387 | | 2/2014 | |
| WO | WO 2014-025570 | | 2/2014 | |
| WO | WO 2014-025983 | | 2/2014 | |
| WO | WO 2017-031294 | | 2/2017 | |
| WO | WO 2017-031298 | | 2/2017 | |

OTHER PUBLICATIONS

Kawabe—JP 2012-184344 A-MT—Curable resin composition w-HPNDA—2012 (Year: 2012).*
Fujita—JP 2013-115059 A-MT—ethylene-fluoro polymer as layer in solar—2013 (Year: 2012).*
Stratakis—plasmotic organic photovoltaic devices—Mater.Today—2013 (Year: 2013).*
Green—Perovskite solar cells—Nature Photonics—2014 (Year: 2014).*
Miwon—Asia-Brochure—HPNDA monomer (Year: 2018).*
Ajay—phys.prop. cured PMMA w-cyclooliphatic comonomer—J. Contemp.Dental Practice—Mar. 2020 (Year: 2020).*
Search Report for Taiwan Appl. No. 105126452, dated Feb. 18, 2020, 1 pg.
Evans, "The thermomechanical integrity of thin films and multilayers", Acta Metallurgica et Materialia, 1995, vol. 43, pp. 2507-2530.
Leterrier, "Durability of nanosized oxygen-barrier coatings on polymers", Progress in Materials Science, 2003, vol. 48, pp. 1-55.
Schaeffer, "Radiation curable components and their use in corrosion resistant applications", Radtech, 2012 UV & EB Technical Conference Proceedings, published Apr. 20, 2012.
Kawabe—JP 2012-184344 A-MT—Curable resin composition w-HPNDA—2012.
Miwan Specialty Chemical Co. Ltd., "The solution in energy curing: energy curing products", dated 2018.
Affinito, "Polymer-Oxide Transparent Barrier Layers", 39$^{th}$ Annual Technical Conference Proceedings, 1996, pp. 392-397.
Affinito, "Vacuum deposited polymer/metal multilayer films for optical application", Thin Solids Films, 1995, vol. 270, No. 1-2, pp. 43-48.
Kayarad FM-400, Nippon Kayaku, Safety Data Sheet, 5 pp.
Miramer M210, Miwon Specialty Chemical Co., Material Safety Data Sheet, 2001, 6 pp.
Shaw, "A New High Speed Process for Vapor Depositing Acrylate Thin Films: An Update", 36$^{th}$ Annual Technical Conference Proceedings, 1993, pp. 348-351.
Shaw, "A New Vapor Deposition Process for Coating Paper and Polymer Webs", 6$^{th}$ International Vacuum Web Coating Conference, Oct. 1992, pp. 18-24.
Shaw, "Use pf Evaporated Acrylate Coatings to Smooth the Surface of Polyester and Polypropylene Film and Aluminum Foil", RadTech'96 North America UV/EB Conference Proceedings, Apr.-May 1996, vol. 2, pp. 701-707.

(56) References Cited

OTHER PUBLICATIONS

Shaw, "Use of Vapor Deposited Acrylate Coatings to Improve the Barrier Properties of Metallized Film", 37$^{th}$ Annual Technical Conference Proceedings, 1994, pp. 240-247.
Product Sheet, "Tricyclo[5.2.1.0$^{2,6}$]decanedimethanol diacrylate", Sigma-Aldrich (url https://www.sigmaaldrich.com/catalog/product/aldrich/496669?lang=en&region=US); downloaded from the internet Sep. 2020.
Product Sheet, "Di(trimethylolpropane) tetraacrylate", Sigma-Aldrich (url https://www.sigmaaldrich.com/catalog/product/aldrich/408360?lang=en&region=US); downloaded from the internet Jan. 2021.
International Search Report for PCT International Application No. PCT/US2016/047514, dated Oct. 24, 2016, 4 pp.

\* cited by examiner

COMPOSITE ARTICLE INCLUDING A MULTILAYER BARRIER ASSEMBLY AND METHODS OF MAKING THE SAME

CROSS REFERENCE TO RELATED APPLICATIONS

This application is a continuation application of U.S. patent application Ser. No. 15/753,027, filed Feb. 15, 2018, now pending, which is a US 371 application of International Application Serial No. PCT/US2016/047514, filed Aug. 18, 2016, which claims the benefit of U.S. Provisional Application Ser. No. 62/206,978, filed Aug. 19, 2015, the disclosures of which are incorporated by reference in their entirety herein.

TECHNICAL FIELD

The present disclosure relates broadly to composite articles including a multilayer barrier assembly and methods of making the same.

BACKGROUND

Multilayer assemblies of polymers and oxides, such as aluminum oxide or silicon oxide, are deposited on flexible polymer films to make barrier films that are resistant to moisture permeation. These barrier films can be prepared by a variety of production methods, including liquid coating techniques such as solution coating, roll coating, dip coating, spray coating, spin coating; and coating techniques such as Chemical Vapor Deposition (CVD), Plasma Enhanced Chemical Vapor Deposition (PECVD), sputtering and vacuum processes for thermal evaporation of liquid and/or solid materials. Examples of such barrier films and processes can be found in U.S. Pat. No. 5,440,446 (Shaw et al.); U.S. Pat. No. 5,877,895 (Shaw et al.); U.S. Pat. No. 6,010,751 (Shaw et al.); U.S. Pat. No. 7,018,713 (Padiyath et al.); and U.S. Pat. No. 6,413,645 (Graff et al.). These barrier films have a number of applications in the display, lighting, and solar markets as flexible replacements for glass encapsulating materials.

Solar technologies such as organic photovoltaic devices (OPVs), perovskite solar cells, and thin film solar cells like copper indium gallium di-selenide (CIGS) require protection from water vapor and oxygen, and need to be durable (e.g., to ultra-violet (UV) light) in outdoor environments. Typically, glass has been used as an encapsulating material for such solar devices because glass is a very good barrier to water vapor, is optically transparent, and is stable to UV light. However, glass is heavy, brittle, difficult to make flexible, and difficult to handle.

U.S. Pat. Appl. Publ. No. 2012/0003448 A1 (Weigel et al.) describes an assembly that includes a barrier layer interposed between a polymeric film substrate and a pressure-sensitive adhesive layer.

SUMMARY

There is a continuing need for barrier films, and other articles that include them, that have superior durability with regard to light resistance and weatherability. In particular, there is a need for flexible, transparent multilayer barrier films that have superior resistance to photodegradation and photo-oxidation.

In a first aspect, the present disclosure provides a composite article comprising:

a substrate;
a multilayer barrier assembly bonded to the substrate, the multilayer barrier assembly comprising:
a base polymer layer adjacent to the substrate, wherein the base polymer layer comprises a polymerized reaction product of polymerizable components comprising at least one di(meth)acrylate represented by the formula wherein:
each $R^1$ independently represents H or methyl;
each $R^2$ independently represents an alkyl group having from 1 to 4 carbon atoms, or any two geminal $R^2$ groups may together form an alkylene group having from 2 to 7 carbon atoms; and
x and z independently represent 0, 1, 2, 3, or 4, with the provisos that at least one of x and z is not zero and $1 \le x+z \le 4$; and
a base inorganic barrier layer bonded to the base polymer layer; and
a top polymer layer bonded to the multilayer barrier assembly opposite the substrate.

In a second aspect, the present disclosure provides a method of making a composite article, the method comprising sequentially:

disposing a multilayer barrier assembly on a substrate, wherein the multilayer barrier assembly comprises:
a base polymer layer adjacent to the substrate, wherein the base polymer layer comprises a polymerized reaction product of polymerizable components comprising at least one di(meth)acrylate represented by the formula wherein:
each $R^1$ independently represents H or methyl;
each $R^2$ independently represents an alkyl group having from 1 to 4 carbon atoms, or any two geminal $R^2$ groups may together form an alkylene group having from 2 to 7 carbon atoms; and
x and z independently represent 0, 1, 2, 3, or 4, with the provisos that at least one of x and z is not zero and $1 \le x+z \le 4$; and
a base inorganic barrier layer bonded to the base polymer layer, wherein the multilayer barrier assembly has an outermost inorganic barrier layer opposite the substrate; and
bonding a top polymer layer to the outermost inorganic barrier layer.

Advantageously, composite articles according to the present disclosure may exhibit improved weatherability, especially with regard to sunlight and ultraviolet light, and resistance to interlayer delamination.

As used herein, the phrase "alkylene" refers to a divalent aliphatic hydrocarbon radical, in which all the carbon-carbon bonds are single bonds.

As used herein, the phrases "bonded to" and "bonding to" mean bonded/bonding either through direct contact or by a single layer of intervening material (e.g., an adhesive, adhesion promoting layer, or glue). While bonding may be temporary, it is preferably secure bonding, wherein bonded portions cannot be separated without mechanical tools and/or causing physical damage to one of the bonded portions.

As used herein, the term "geminal" refers to the relationship between two groups that are bonded directly to the same carbon atom.

As used herein, the term "(meth)acryl" (e.g., as in (meth)acrylate) refers to either "acryl" or "methacryl", or in the case where multiple "(meth)acryl" groups are present, it may also refer to combinations of acryl and methacryl.

As used herein, the phrase "(meth)acrylic polymer" refers to a polymer containing at least one monomer unit derived from (meth)acrylic acid (e.g., a (meth)acrylic acid alkyl ester, a (meth)acrylamide, (meth)acrylic acid, (meth)acrylonitrile).

As used herein, the term "transparent" means transparent to visible light unless otherwise indicated.

Features and advantages of the present disclosure will be further understood upon consideration of the detailed description as well as the appended claims.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Figure 1:
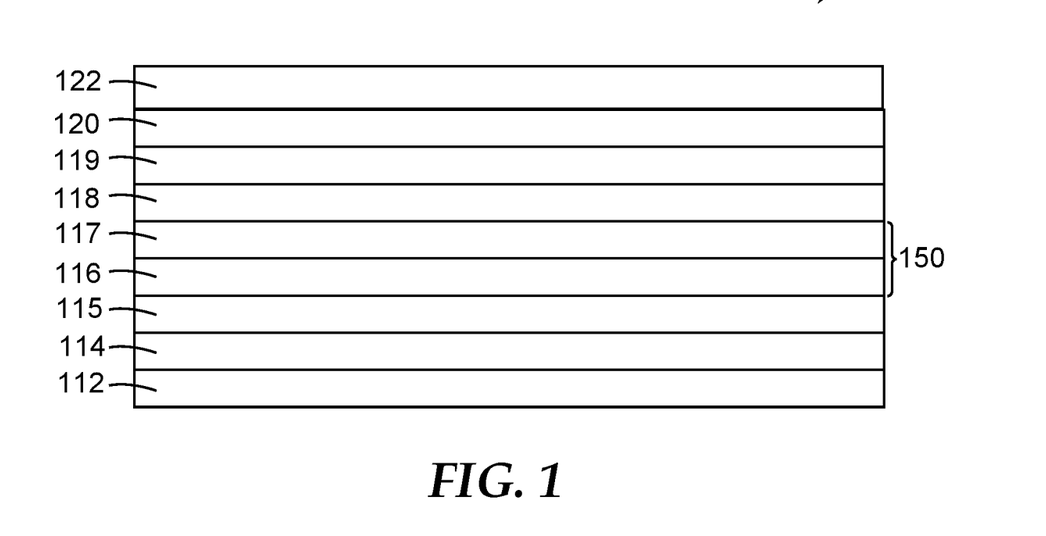
FIG. 1 is a schematic cross-section showing an exemplary composite article 100 according to the present disclosure.

FIG. 1 is a schematic cross-section of an exemplary composite article 100. Composite article 100 includes layers arranged in the following order: substrate 112; base polymer layer 114; base inorganic barrier layer 115; optional multilayer barrier assembly 150; optional adhesion-modifying layer 118; top polymer layer 119, optional pressure-sensitive adhesive layer 120 and optional cover layer 122. Optional multilayer barrier assembly 150 can include from 1 to 100 or more pairs of intermediate polymer layer 116 and intermediate inorganic barrier layer 117 disposed between base inorganic barrier layer 115 and top polymer layer 119. Optional intermediate polymer layers 116 and intermediate inorganic barrier layers 117 may be arranged in alternating sequence (e.g., 116, 117, 116, 117), although in some embodiments the arrangement may differ.

Despite optional adhesion-modifying layer 118 being positioned between optional intermediate inorganic barrier layer 117 and top polymer layer 119 in FIG. 1, it is to be understood that the adhesion-modifying layer can be disposed at any polymer-polymer or polymer-oxide interface. Specifically, the adhesion-modifying layer may be disposed between the substrate and the base polymer layer, between the base polymer layer and the base inorganic barrier layer, between the intermediate inorganic barrier layer and the top polymer layer, or above the top polymer layer, for example.

The substrate may be unitary or it may contain multiple components (e.g., layers). Examples of layers that may be included in the substrate include polymer films and adhesive (e.g., hot-melt adhesive and/or pressure-sensitive adhesive) layers. Optional adhesive layers of the substrate may be adjacent, or opposite, to the base polymer layer. The substrate may be a polymer film or it may be some other article to be protected; for example, and optical or electronic article. Examples of articles include electronic displays (e.g., LED, plasma, electrophoretic, and LCD displays), electronic light sources (LED, OLED, and quantum dot light sources), thin film transistors (alone or in arrays), photovoltaic devices (e.g., solar cells), solar collectors, and combinations thereof.

Substrates that are polymer films may be transparent or non-transparent, e.g., opaque. Polymer films that are non-transparent may be formed from transparent polymers that contain fillers, such as titanium dioxide, silica, and alumina.

Substrates that include polymer films may be transmissive to ultraviolet light (UV), visible light (VIS), and/or infrared light (IR). Exemplary polymers suitable for use in fabricating the substrate (e.g., as a polymer film) include polyesters (e.g., polyethylene terephthalate (PET) and polyethylene naphthalate (PEN)), polyethylene terephthalate (PET), polycarbonate (e.g., formed by condensation polymerization of bisphenol A and phosgene), polymethyl methacrylate, polyethylene naphthalate (PEN), polyetheretherketone (PEEK), polyaryletherketone (PAEK), polyarylate (PAR), fluoropolymers, polyetherimide (PEI), polyarylsulfone (PAS), polyethersulfone (PES), polyamideimide (PAI), and polyimide, any of which may optionally be heat-stabilized. In some embodiments, the substrate is a polyester or heat-stabilized polyester film.

Suitable polymer film substrates are commercially available from a variety of sources. Polyimides are available, for example, from E.I. du Pont de Nemours & Co., Wilmington, Del., under the trade designation KAPTON (e.g., KAPTON E or KAPTON H); from Kaneka North America LLC, Pasadena, Calif., under the trade designation APICAL AV; from UBE America Inc., Wixom, Mich. under the trade designation UPILEX. Polyethersulfones are available, for example, from Sumitomo Chemical Co., Tokyo, Japan. Polyetherimides are available, for example, from General Electric Company, Fairfield, Conn., under the trade designation ULTEM. Polyesters such as PET are available, for example, from DuPont Teijin Films, Hopewell, Va. Further details are described in U.S. Pat. Appl. Publ. No. 2012/0003448 A1 (Weigel et al).

The substrate may have any thickness. In some embodiments, the substrate has a thickness of at least 0.005, 0.01, 0.02, 0.025, 0.03, 0.04, 0.05, 0.06, 0.07, 0.08, 0.09, 0.1, 0.11, 0.12, or 0.13 mm. In those embodiments in which the substrate comprises a polymer film, the polymer film preferably has a thickness of from 0.01 mm to 1 mm, more preferably, from 0.02 mm to 0.5 mm, and more preferably from 0.05 mm to 0.25 mm. Thicknesses outside these ranges may also be useful, depending on the application. Substrate thicknesses greater than 0.025, 0.03, 0.04, 0.05, or 0.1 mm may be preferred for handling purposes or in applications in which the composite article serves to electrically insulate electrical and electronic components in addition to providing a barrier to water vapor and/or oxygen. Preferably, when the substrate is a polymer film, the composite article is flexible and substantially transparent (e.g., to visible light).

The base polymer layer comprises a polymerized reaction product of polymerizable components comprising at least one di(meth)acrylate represented by Formula I, below (I)

Each $R^1$ independently represents H or methyl.

Each $R^2$ independently represents an alkyl group having from 1 to 4 carbon atoms (e.g., methyl, ethyl, propyl, or butyl), or any two geminal $R^2$ groups may together form an alkylene group having from 2 to 7 carbon atoms (e.g., ethan-1,2-diyl, propan-1,3-diyl, butan-1,4-diyl, 2-methylpropane-1,3-diyl, pentan-1,5-diyl, hexan-1,6-diyl, and 2,2-dimethylpentan-1,3-diyl).

x and z independently represent 0, 1, 2, 3, or 4, with the provisos that at least one of x and z is not zero, and $1 \leq x+z \leq 4$. In some preferred embodiments, $R^1$ is H and $R^2$ is methyl. In some preferred embodiments (e.g., those wherein $R^1$ is H and $R^2$ is methyl), x=0, 1, or 2; and z=0, 1, or 2; and x+z=1 or 2.

Di(meth)acrylates according to Formula I can be obtained commercially or obtained by known methods. For example, di(meth)acrylates according to Formula I can be made by reaction of the corresponding diols with (meth)acryloyl chloride, (meth)acrylic acid, and/or methyl (meth)acrylate. Preferred di(meth)acrylates of Formula I include those where $R^1$ is H and $R^2$ is methyl. A preferred di(meth)acrylate of Formula I is a diacrylate of the hydroxypivalate monoester of neopentyl glycol (also known as hydroxypivalic acid neopentyl glycol diacrylate and 3-[2,2-dimethyl-1-oxo-3-[(1-oxoallyl)oxy]propoxy]-2,2-dimethylpropyl acrylate), available as MIRAMER M210 from Miwon Specialty Chemical Co., Ltd., Korea. The diacrylate of the hydroxypivalate mono-ester of neopentyl glycol is represented by Formula I, where $R^1$ is H and $R^2$ is methyl; x=0 or 1; z=0 or 1; and x+z=1.

The base polymer layer, optional intermediate polymer layer(s), and top polymer layer may comprise a polymerized reaction product of polymerizable components comprising at least one di(meth)acrylate represented by Formula I. In some embodiments, on a weight basis, the polymerizable components used to form the respective polymer layer comprise at least 25 percent, at least 30 percent, at least 35 percent, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, at least 99 percent, or even 100 percent of at least one di(meth)acrylate (e.g., individually or collectively) represented by Formula I. Preferably, the base and any intermediate polymer layers independently comprise polymerized reaction products of polymerizable components comprising at least one di(meth)acrylate represented by Formula I, hereinbefore.

Additional monomers may be combined with the at least one di(meth)acrylate represented by Formula I. Exemplary such additional monomers and oligomers include (meth) acrylic monomers described below in reference to the optional intermediate polymer layer(s).

The use of acrylates and mixtures of acrylates and methacrylates is typically preferable relative to methacrylates alone when faster polymerization or curing is desired, which is often the case for economical, web-based processes.

In some embodiments, an additional monomer combined with the at least one di(meth)acrylate represented by Formula I is neopentyl glycol di(meth)acrylate. On a weight basis, the polymerizable components used to form the respective polymer layer may contain less than 75 percent, less than 70 percent, less than 65 percent, less than 60 percent, less than 55 percent, less than 50 percent, less than 45 percent, less than 40 percent, less than 35 percent, less than 30 percent, less than 25 percent, less than 20 percent, less than 15 percent, less than 10 percent, less than 5 percent, or even less than 1 percent of neopentyl glycol di(meth) acrylate.

The base polymer layer can be prepared by vapor deposition and subsequent polymerization of corresponding monomer(s) and oligomer(s); for example, as described hereinbelow.

The base, intermediate, and top polymer layers can be independently formed by applying respective layers of a polymerizable monomer(s) and/or oligomer(s) and polymerizing (generally resulting in a crosslinked polymer network) each layer to form the corresponding polymer. Examples of deposition techniques include flash evaporation and vapor deposition. Polymerization of the monomer(s) and/or oligomers(s) can be effected using an electron beam apparatus, UV light source, electrical discharge apparatus or other suitable device. In preferred embodiments, the deposition and polymerization steps are carried out under vacuum.

The base polymer layer can be applied, for example, to the substrate, and the optional intermediate polymer layer can be applied to the base inorganic barrier layer. The materials and methods useful for forming the base and intermediate polymer layers may be independently selected to be the same or different. Preferably, the base and any intermediate polymer layers independently comprise polymerized reaction products of polymerizable components comprising at least one di(meth)acrylate represented by Formula I, hereinbefore.

In some embodiments, polymerizable layers can be applied to the substrate, and/or any inorganic barrier layer(s) that may be also present, by flash evaporation and/or vapor deposition of polymerizable monomers and/or oligomers followed by polymerization and/or crosslinking in situ.

Useful techniques for flash evaporation and vapor deposition followed by polymerization in situ can be found, for example, in U.S. Pat. No. 4,696,719 (Bischoff), U.S. Pat. No. 4,722,515 (Ham), U.S. Pat. No. 4,842,893 (Yializis et al.), U.S. Pat. No. 4,954,371 (Yializis), U.S. Pat. No. 5,018, 048 (Shaw et al.), U.S. Pat. No. 5,032,461 (Shaw et al.), U.S. Pat. No. 5,097,800 (Shaw et al.), U.S. Pat. No. 5,125,138 (Shaw et al.), U.S. Pat. No. 5,440,446 (Shaw et al.), U.S. Pat. No. 5,547,908 (Furuzawa et al.), U.S. Pat. No. 6,045,864 (Lyons et al.), U.S. Pat. No. 6,231,939 (Shaw et al.), and U.S. Pat. No. 6,214,422 (Yializis); in PCT Pat. Publ. No. WO 00/26973 (Delta V Technologies, Inc.); in D. G. Shaw and M. G. Langlois, "A New Vapor Deposition Process for Coating Paper and Polymer Webs", *6th International Vacuum Coating Conference* (1992); in D. G. Shaw and M. G. Langlois, "A New High Speed Process for Vapor Depositing Acrylate Thin Films: An Update", *Society of Vacuum Coaters 36th Annual Technical Conference Proceedings*

(1993); in D. G. Shaw and M. G. Langlois, "Use of Vapor Deposited Acrylate Coatings to Improve the Barrier Properties of Metallized Film", *Society of Vacuum Coaters 37th Annual Technical Conference Proceedings* (1994); in D. G. Shaw, M. Roehrig, M. G. Langlois and C. Sheehan, "Use of Evaporated Acrylate Coatings to Smooth the Surface of Polyester and Polypropylene Film Substrates", RadTech (1996); in J. Affinito, P. Martin, M. Gross, C. Coronado and E. Greenwell, "Vacuum deposited polymer/metal multilayer films for optical application", *Thin Solid Films* 270, 43-48 (1995); and in J. D. Affinito, M. E. Gross, C. A. Coronado, G. L. Graff, E. N. Greenwell and P. M. Martin, "Polymer-Oxide Transparent Barrier Layers", *Society of Vacuum Coaters 39th Annual Technical Conference Proceedings* (1996).

In some embodiments, the polymer layers and inorganic barrier layer(s) are sequentially deposited in a single pass vacuum coating operation with no interruption to the coating process. Enhanced barrier properties may be observed when the polymer layers and inorganic barrier layer(s) are sequentially vapor deposited without any coating-side contact with rollers or other solid surfaces until after the deposition of the top polymer layer. The coating efficiency of the base polymer layer can be improved, for example, by cooling the substrate. Similar techniques can also be used to improve the coating efficiency of subsequent polymer layers.

The monomer and/or oligomer useful for forming the base and/or intermediate polymer layers and top polymer layer can also be applied using conventional coating methods such as roll coating (e.g., gravure roll coating), die coating, inkjet coating, or spray coating (e.g., example, electrostatic spray coating). The base polymer layer, intermediate polymer layer(s), and top polymer layer can also be formed by applying a layer containing an oligomer or polymer in solvent and then removing the solvent using conventional techniques (e.g., at least one of heat or vacuum). Plasma polymerization may also be employed.

In some embodiments, the top polymer layer comprises a (meth)acrylic polymer that has a glass transition temperature of at least 80° C., at least 90° C., at least 100° C., at least 110° C., at least 120° C., at least 130° C., at least 140° C., at least 150° C., at least 160° C., at least 170° C., or at least 180° C. (Meth)acrylic polymers that have a glass transition temperature of at least 110° C., at least 120° C., at least 130° C., at least 140° C., or at least 150° C. are preferred. In some embodiments, the (meth)acrylic polymer of the top polymer layer is formed from the polymerization of monomers comprising the di(meth)acrylate of the hydroxypivalate mono-ester of neopentyl glycol. In some embodiments, the (meth)acrylic polymer of the top polymer layer is formed from the polymerization of monomers comprising (meth) acrylates that contain cycloaliphatic groups, which optionally may contain the heteroatoms, N, O, and S, wherein from 6 to 12 atoms, exclusive of substituent atoms, form the ring(s). In some embodiments, the 6 to 12 atoms that form the ring(s) are bonded by single bonds. In some embodiments, 6 to 12 carbon atoms and no heteroatoms form the ring(s). In some embodiments, the cycloaliphatic group is monocyclic, bicyclic, or polycyclic. In some embodiments the (meth)acrylates that contain cycloaliphatic groups are selected from at least one of tricyclodecanedimethanol di(meth)acrylate, di(meth)acrylate of diol formed from the acetalation of trimethylolpropane with hydroxypivalaldehyde, tris(2-hydroxyethyl)-isocyanurate tri(meth)acrylate, cyclohexanedimethanol di(meth)acrylate, and isobornyl methacrylate. In some preferred embodiments, the (meth) acrylic polymer of the top polymer layer is formed from the polymerization of polymerizable components comprising at least 50 percent, at least 55 percent, at least 60 percent, at least 65 percent, at least 70 percent, at least 75 percent, at least 80 percent, at least 85 percent, at least 90 percent, at least 95 percent, or even 100 percent by weight of tricyclodecanedimethanol di(meth)acrylate.

The inorganic barrier layer(s), which can be the same or different, can be formed from a variety of materials. Useful materials include metals, metal oxides, metal nitrides, metal carbides, metal oxynitrides, metal oxyborides, and combinations thereof. Exemplary metal oxides include silicon oxides such as silica, aluminum oxides such as alumina, titanium oxides such as titania, indium oxides, tin oxides, indium tin oxide (ITO), tantalum oxide, zirconium oxide, zinc oxides, niobium oxide, hafnium oxides, and combinations thereof. Other exemplary materials include boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof. In some embodiments, some or all of the inorganic barrier layers (e.g., base inorganic barrier layer and/or intermediate inorganic barrier layer(s)) comprise at least one of ITO, silicon oxide, or aluminum oxide. In some embodiments, with the proper selection of the relative proportions of each elemental constituent, ITO can be electrically conductive.

Inorganic barrier layer(s) can be formed, for example, using techniques employed in the film metallizing art such as sputtering (e.g., cathode or planar magnetron sputtering, dual AC planar magnetron sputtering or dual AC rotatable magnetron sputtering), evaporation (for example, resistive or electron beam evaporation and energy enhanced analogs of resistive or electron beam evaporation including ion beam and plasma assisted deposition), chemical vapor deposition, plasma-enhanced chemical vapor deposition, atomic layer deposition, and electroplating. In some embodiments, the inorganic barrier layers are formed using sputtering, for example, reactive sputtering. Enhanced barrier properties may be observed when the inorganic barrier layer is formed by a high energy deposition technique such as sputtering compared to lower energy techniques such as thermal evaporation vapor deposition processes. Enhanced barrier properties may be observed when the inorganic barrier layer is formed with minimal defects by a vapor deposition technique such as atomic layer deposition.

If more than one inorganic barrier layer is present, the materials, thicknesses, and methods used for forming the inorganic barrier layers may be independently selected to be the same or different. When more than one inorganic barrier layer is present, the inorganic barrier layers can respectively be referred to as the "base inorganic barrier layer" and "intermediate inorganic barrier layer(s)". Additional polymer layers may be present in between additional inorganic barrier layers. For example, a multilayer barrier assembly may contain alternating intermediate polymer layer/intermediate inorganic barrier layer pairs disposed on the base inorganic barrier layer. The barrier film can include any number of such layered pairs. In some embodiments, various types of optional layers may be present between the layered pairs.

The desired chemical composition and thickness of each inorganic barrier layer will typically depend in part on the nature and surface topography of the underlying layer and on the desired optical properties for the barrier film. The inorganic barrier layer(s) may have a homogeneous or inhomogeneous composition (e.g., having a composition gradient). Inorganic barrier layers typically are sufficiently thick so as to be continuous, and sufficiently thin so as to ensure that the composite articles (e.g., barrier films and assemblies) disclosed herein will have the desired degree of visible light transmission and flexibility. The physical thickness (as opposed to the optical thickness) of each inorganic barrier layer may be, for example, about 3 nanometers (nm) to about 150 nm (in some embodiments, about 4 nm to about 75 nm). The inorganic barrier layer typically has an average transmission over the visible portion of the spectrum of at least about 75% (in some embodiments at least about 80, 85, 90, 92, 95, 97, or 98%) measured along the normal axis. In some embodiments, the inorganic barrier layer has an average transmission over a range of 400 nm to 1400 nm of at least about 75% (in some embodiments at least about 80, 85, 90, 92, 95, 97, or 98%). Useful inorganic barrier layers typically are those that do not interfere with absorption of visible or infrared light, for example, by photovoltaic cells.

Optional intermediate polymer layers may be the same as or different from the base polymer layer. Suitable materials may include any materials suitable for use as the base polymer layer and/or the top polymer layer.

(Meth)acrylate monomers may be used for forming the base polymer layer, the optional intermediate polymer layer(s), and the top polymer layer, for example. Volatilizable (meth)acrylate monomers are useful in the flash evaporation and vapor deposition of monomer(s) followed by polymerization to form the polymer layer(s). Volatilizable (meth) acrylate monomers may have a molecular weight in the range from about 150 to about 600 grams per mole, or, in some embodiments, from about 200 to about 600 grams per mole, although molecular weights outside of these ranges may also be volatilizable.

Volatilizable (meth)acrylate monomers preferably have vapor pressures at 25° C. less than approximately 20 micrometers Hg (2.7 Pa). For monomers whose vapor pressure is greater than about 20 micrometers Hg (2.7 Pa) at 25° C. (e.g., as in the case of neopentyl glycol diacrylate), condensation of the monomer to form a layer or film on the substrate or any inorganic barrier layer typically requires uneconomical, slow coating speeds and/or has too low an efficiency for practical coating operations. Adequate efficiency may not be obtained until the surface of the substrate is cooled below the freezing point of the monomer (e.g., in the case of neopentyl glycol diacrylate, the freezing point is 6° C.), in which case the monomer may not polymerize properly. If the vapor pressure of the monomer is extremely low, exceptionally high temperatures may be required to evaporate sufficient material for forming a coating (i.e., polymerizable layer), on the substrate or any inorganic barrier layer at a reasonable coating speed. High temperatures may lead to thermal decomposition or premature polymerization/curing of monomers and/or oligomers.

Mixtures of more volatile monomers (i.e., those with vapor pressures greater than 20 micrometers Hg (2.7 Pa) at 25° C.) with other monomers that have vapor pressures less than 20 micrometers Hg (2.7 Pa) at 25° C. may be amenable to vapor deposition onto webs. To coat a given layer thickness at a given web speed, coating a mixture requires a lower rate of condensation of the more volatile monomer (wt. of more volatile monomer condensed per unit of time) relative to coating only the more volatile monomer. In addition, the rate of crystallization of the more volatile monomer may be retarded or its freezing point may be suppressed in the mixture relative to the more volatile monomer alone.

Exemplary useful (meth)acrylates include hexanediol di(meth)acrylate, ethoxyethyl (meth)acrylate, phenoxyethyl (meth)acrylate, cyanoethyl mono(meth)acrylate, isobornyl (meth)acrylate, octadecyl (meth)acrylate, isodecyl (meth) acrylate, lauryl (meth)acrylate, beta-carboxyethyl (meth) acrylate, tetrahydrofurfuryl (meth)acrylate, dinitrile (meth) acrylate, pentafluorophenyl (meth)acrylate, nitrophenyl (meth)acrylate, 2-phenoxyethyl (meth)acrylate, 2,2,2-trifluoromethyl (meth)acrylate, diethylene glycol di(meth)acrylate, triethylene glycol di(meth)acrylate, tripropylene glycol di(meth)acrylate, tetraethylene glycol di(meth)acrylate, neopentyl glycol di(meth)acrylate, propoxylated neopentyl glycol di(meth)acrylate, polyethylene glycol di(meth)acrylate, bisphenol A epoxy di(meth)acrylate, 1,6-hexanediol di(meth)acrylate, di(meth)acrylate of the hydroxypivalate monoester of neopentyl glycol, trimethylolpropane tri(meth)acrylate, ethoxylated trimethylolpropane tri(meth)acrylate, propoxylated trimethylolpropane tri(meth)acrylate, tris(2-hydroxyethyl)isocyanurate tri(meth)acrylate, pentaerythritol tri(meth)acrylate, di(meth)acrylate of diol formed from the acetalation of trimethylolpropane with hydroxypivalaldehyde, phenylthioethyl (meth)acrylate, naphthyloxyethyl (meth)acrylate, cyclic di(meth)acrylates (for example, EB-130 from Cytec Industries Inc. and tricyclodecanedimethanol diacrylate, available as SR833S from Sartomer Co.), epoxy acrylate RDX80095 from Cytec Industries Inc., (meth)acryloxysilanes (e.g., methacryloxypropyltrimethoxysilane from Gelest, Inc.), and combinations thereof.

Additional useful (meth)acrylate monomers for forming the base polymer layer, optional intermediate layer(s), and the top polymer layer include urethane (meth)acrylates (e.g., urethane acrylates available as CN-968 and CN-983 from Sartomer Co., Exton, Pa.), dipentaerythritol penta(meth) acrylate (e.g., dipentaerythritol pentaacrylate available as SR-399 from Sartomer Co.), epoxy (meth)acrylates blended with styrene (e.g., epoxy acrylate blended with styrene available as CN-120S80 from Sartomer Co.), ditrimethylolpropane tetra(meth)acrylate (e.g., ditrimethylolpropane tetraacrylate available as SR-355 from Sartomer Co.), 1,3-butylene glycol di(meth)acrylate (e.g., 1,3-butylene glycol diacrylate available as SR-212 from Sartomer Co.), penta (meth)acrylate esters (e.g., pentaacrylate esters available as SR-9041 from Sartomer Co.), pentaerythritol tetra(meth) acrylate (e.g., pentaerythritol tetraacrylate available as SR-295 from Sartomer Co.), ethoxylated trimethylolpropane tri(meth)acrylates (e.g., ethoxylated (3) trimethylolpropane triacrylate available as SR-454 from Sartomer Co.), 2-propenic acid, [2-[1,1-dimethyl-2-[(1-oxo-2-propenyl)oxy] ethyl]-5-ethyl-1,3-dioxan-5-yl] methyl ester available as KAYARAD R-604 from Nippon Kayaku Co., Ltd., Tokyo, Japan, alkoxylated trifunctional (meth)acrylate esters (e.g., alkoxylated trifunctional acrylate ester available as SR-9008 from Sartomer Co.), ethoxylated bisphenol A di(meth)acrylates (e.g., ethoxylated (4) bisphenol A dimethacrylate available as CD-450 from Sartomer Co.), cyclohexanedimethanol di(meth)acrylate esters (e.g., cyclohexanedimethanol diacrylate esters available as CD-406 from Sartomer Co.), cyclic diacrylate available as IRR-214 from UCB Chemical, Smyrna, Ga., diacrylate of hydroxypivalate mono-ester of neopentyl glycol available as MIRAMER M210 from Miwon Specialty Chemical Co., Ltd., Korea and/or as FM-400 from Nippon Kayaku Co., Ltd., and combinations with the foregoing (meth)acrylate monomers hereinabove.

The use of acrylates and mixtures of acrylates with methacrylates is typically preferable relative to methacrylates alone when faster polymerization or curing is desired, which is often the case for economical, web-based processes, with the exception of fluorinated methacrylates, which are already typically fast curing.

Other polymerizable monomers that may be useful for forming any of the base polymer layer, optional intermediate polymer layer(s), and the top polymer layers include vinyl ethers, vinyl naphthalene, acrylonitrile, combinations thereof, and combinations with the foregoing (meth)acrylate monomers hereinabove.

Photoinitiators and thermal initiators may be added to the polymerizable monomers that are polymerized to form the base polymer layer, optional intermediate polymer layer(s), and top polymer layer. If present, the initiators are typically present at levels of 0.1 to 5.0 weight percent of the polymerizable monomers, although this is not a requirement.

The desired thickness of the base polymer layer will typically depend in part on the nature and surface topography of the substrate. The thickness of the base, and optional intermediate polymer layer(s) will typically be sufficient to minimize defects and discontinuities, and provide a smooth surface to which inorganic barrier layer can be applied subsequently. For example, the base polymer layer may have a thickness of a few nanometers (nm) (e.g., 2 or 3 nm) to about 5 micrometers or more. The thickness of the intermediate polymer layer(s), and/or the top polymer layer may also be in this range and may, in some embodiments, be thinner than the base polymer layer, and in some embodiments thicker than the base polymer layer. In some embodiments, the individual thickness of the base polymer layer, intermediate polymer layer(s), and/or top polymer layer may be from 180 nm to 1500 nm.

In some embodiments, at least one optional adhesion modifying layer is included in the composite article. In some embodiments, the optional adhesion-modifying layer is an adhesion-promoting layer, which improves the moisture-resistance of composite article and the peel strength adhesion of the composite article, for example. Surface treatments or tie layers can be applied between any of the polymer layers or inorganic barrier layers, for example, to improve smoothness or adhesion. Useful surface treatments include electrical discharge in the presence of a suitable reactive or non-reactive atmosphere (e.g., plasma, glow discharge, corona discharge, dielectric barrier discharge or atmospheric pressure discharge); chemical pretreatment; or flame pretreatment. Exemplary useful tie layers include a separate polymeric layer or a metal-containing layer such as a layer of metal, metal oxide, metal nitride or metal oxynitride. The tie layer may have a thickness of a few nanometers (nm) (e.g., 1 or 2 nm) to about 50 nm or more.

In other embodiments, the adhesion-modifying layer is a release layer, which may provide for temporary protection of the inorganic barrier layer. Exemplary materials for the layers of composite article are identified below and in the Examples.

Figure 2:
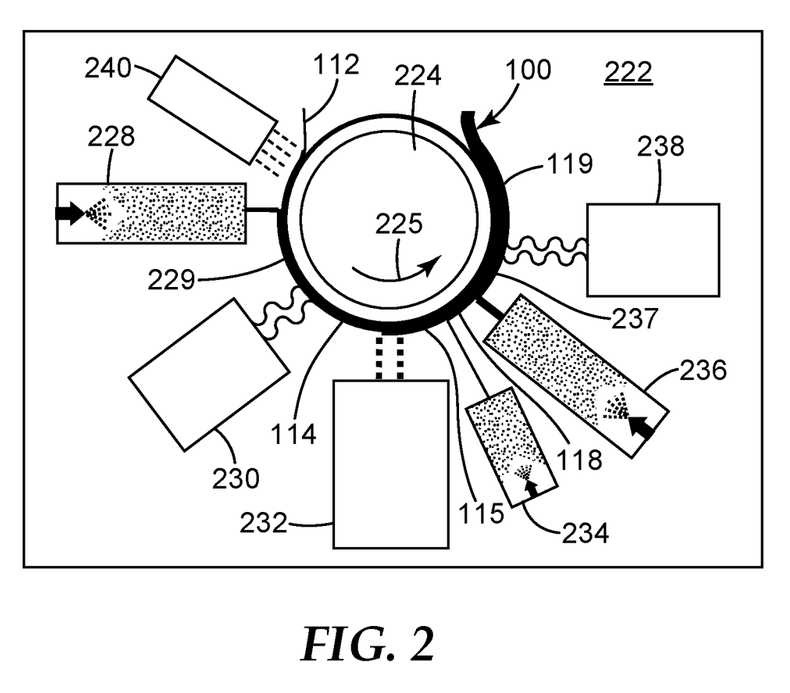
FIG. 2 is a schematic diagram illustrating a process for making composite article 100.

FIG. 2 is a diagram of a system 222 illustrating an exemplary process for making composite article 100. System 222 is under vacuum and includes a chilled drum 224 for receiving and moving the substrate, as represented by film 112, providing a moving web. Film 112 can be surface-modified using optional plasma treater 240. Next an evaporator 228 applies polymerizable material (e.g., monomers and/or oligomers) 229, which is cured by curing unit 230 to form base polymer layer 114 as drum 224 advances the film in a direction shown by arrow 225. An oxide sputter unit 232 applies an oxide to form base inorganic barrier layer 115 as drum 224 advances film 112. For optional alternating layers of intermediate polymer layer(s) 116 and intermediate inorganic barrier layer(s) 117, drum 224 can rotate in a reverse direction opposite arrow 225 and then advance film 112 again to apply additional alternating polymer and inorganic barrier layers, and that sub-process can be repeated for as many alternating layers as desired or needed. Once the alternating layers of polymer and inorganic oxide are complete, drum 224 further advances the film, and an evaporator 234 optionally deposits an adhesion-modifying layer 118. Drum 224 further advances the film, and an evaporator 236 deposits the polymerizable material (e.g., monomer and/or oligomers) 237. Polymerizable material 237 is polymerized by curing unit 238 to form top polymer layer 119. Optional adhesion-modifying layer 118 and top polymer layer 119 can be prepared separately. Alternatively, optional adhesion-modifying layer 118 and polymerizable material 237 can be cured together by curing unit 238. Top polymer layer 119 can include, for example, a radiation cured monomer (e.g., a (meth)acrylic polymer). The Examples included hereinbelow describe in more detail similar exemplary processes in which evaporators 228, 236 include ultrasonic atomizers.

Notwithstanding the system 222 shown in FIG. 2, it is to be understood that adhesion-modifying layers may be present at any interface, as described above. Adhesion-modifying layers may be adhesion-promoting layers or release layers. System 222 may comprise additional evaporators and/or curing units or the location of the existing evaporators/curing units may be altered. Alternatively, for additional alternating layers of oxide, adhesion-modifying layer, and polymer layer, drum 224 can rotate in a reverse direction opposite arrow 225 and then advance film 112 again to apply the additional alternating oxide, adhesion-modifying layer, and polymer layer. This sub-process can be repeated for as many alternating layers as desired or needed. In addition, polymerizable materials 229 and 237 may contain minor amounts of adhesion-modifying materials that may preferentially migrate to one or both major surfaces of polymer layers 114, 116, and/or 119 to form adhesion-modifying layers.

Adhesion-promoting materials often have at least one moiety that is reactive with or capable of non-reactive interaction with at least one adjacent layer. In some embodiments, the moieties are reactive and/or capable of non-reactive interaction with both adjacent layers. Exemplary materials for use in the adhesion-promoting layer include, for example, organosilanes (e.g., silane coupling agents, trialkoxysilanes, trihalosilanes, triacetoxysilanes, cyclic azasilanes, and amino-functional organosilanes), hydroxamic acids, phosphoric acid esters, phosphonic acid esters, phosphonic acids, zirconates, titanates, all of which may have additional reactive groups such as, for example, (meth)acryloxy and epoxy. Other suitable adhesion-promoting materials include those described in PCT Pat. Publ. Nos. WO 2014/025983 A1 (Spagnola et al.), WO 2014/025570 A1 (Spagnola et al.), WO 2014/025384 A1 (Klun et al.), WO 2014/025385 A1 (Klun et al.), WO 2014/025386 A1 (Klun et al.), and WO 2104/025387 A1 (Klun et al.)

In some embodiments, the adhesion-promoting layer is a silane coupling agent (typically an organosilane). A characteristic of this type of material is its ability to react with metal-hydroxyl (metal-OH) groups on a freshly sputter deposited metal inorganic barrier layer, such as, for example, a freshly sputtered $SiO_2$ layer with surface hydroxyl-silanol (Si—OH) groups. The amount of water vapor present in a multi-process vacuum chamber can be controlled sufficiently to promote the formation of Si—OH groups in high enough surface concentration to provide increased bonding sites. With residual gas monitoring and the use of water vapor sources, the amount of water vapor in a vacuum chamber can be controlled to ensure adequate generation of Si—OH groups.

Typically, adhesion between the release layer and at least one adjacent layer is low enough to enable the removal of said adjacent layer under appropriate conditions, but not so low that the layers prematurely separate by forces normally encountered in normal handling and processing operations. Exemplary materials used in the release layer include silicones, fluorinated materials (e.g., monomers, oligomers, or polymers containing fluoroalkyl, fluoroalkylene, and/or perfluoropolyether moieties), soluble materials, and alkyl chains (e.g., straight, branched, and/or cyclic hydrocarbon moieties containing 14-36 carbon atoms).

In some embodiments, one or more of the polymer layers (e.g., the base polymer layer, optional intermediate polymer layer(s), or top polymer layer) in the composite article can be formed from co-depositing a silane (e.g., an aminosilane, (meth)acryloxysilane, or cyclic azasilane) and a radiation-curable monomer (e.g., any of the (meth)acrylates listed above). Co-depositing includes co-evaporating and evaporating a mixture of the silane and the monomer. Cyclic azasilanes are ring compounds, wherein at least one of the ring members is a nitrogen and at least one of the ring members is a silicon, and wherein the ring contains at least one nitrogen-to-silicon bond.

In some embodiments, one or more of the polymer layers (e.g., the base polymer layer, optional intermediate polymer layer(s), or top polymer layer) may contain an ultraviolet light absorber (UVA), hindered amine light stabilizer (HALS), and/or anti-oxidant.

In some embodiments, useful multilayer barrier assemblies comprise inorganic/organic multilayers as described in U.S. Pat. No. 7,018,713 (Padiyath et al.). Useful multilayer constructions and/or methods useful for their construction can also be found, for example, in U.S. Pat. No. 4,696,719 (Bischoff), U.S. Pat. No. 4,722,515 (Ham), U.S. Pat. No. 4,842,893 (Yializis et al.), U.S. Pat. No. 4,954,371 (Yializis), U.S. Pat. No. 5,018,048 (Shaw et al.), U.S. Pat. No. 5,032,461 (Shaw et al.), 5,097,800 (Shaw et al.), U.S. Pat. No. 5,125,138 (Shaw et al.), U.S. Pat. No. 5,440,446 (Shaw et al.), U.S. Pat. No. 5,547,908 (Furuzawa et al.), U.S. Pat. No. 6,045,864 (Lyons et al.), U.S. Pat. No. 6,231,939 (Shaw et al.) and U.S. Pat. No. 6,214,422 (Yializis); in PCT Pat. Publ. No. WO 00/26973 (Delta V Technologies, Inc.); in D. G. Shaw and M. G. Langlois, "A New Vapor Deposition Process for Coating Paper and Polymer Webs", *6th International Vacuum Coating Conference* (1992), pp. 18-24; in D. G. Shaw and M. G. Langlois, "A New High Speed Process for Vapor Depositing Acrylate Thin Films: An Update", *Society of Vacuum Coaters 36th Annual Technical Conference Proceedings* (1993), pp. 348-351; in D. G. Shaw and M. G. Langlois, "Use of Vapor Deposited Acrylate Coatings to Improve the Barrier Properties of Metallized Film", *Society of Vacuum Coaters 37th Annual Technical Conference Proceedings* (1994), pp. 240-247; in D. G. Shaw, M. Roehrig, M. G. Langlois and C. Sheehan, "Use of Evaporated Acrylate Coatings to Smooth the Surface of Polyester and Polypropylene Film Substrates", *RadTech '96 North America, UV/EB Conference Proceedings, Vol. II* (1996), pp. 701-707; in J. Affinito, P. Martin, M. Gross, C. Coronado and E. Greenwell, "Vacuum deposited polymer/metal multilayer films for optical application", *Thin Solid Films* (1995), 270, pp. 43-48; and in J. D. Affinito, M. E. Gross, C. A. Coronado, G. L. Graff, E. N. Greenwell and P. M. Martin, "Polymer-Oxide Transparent Barrier Layers", *39th Annual Technical Conference Proceedings* (1996), pp. 392-397.

The polymer layers, (e.g., base, intermediate, top) and inorganic barrier layer(s) and/or the substrate may be insulated from the environment. For the purpose of the present application, the multilayer barrier assembly and substrate are insulated when they have no interface with the air surrounding the assembly. The major surface of the substrate can be treated to improve adhesion to the multilayer barrier assembly. Useful surface treatments include electrical discharge in the presence of a suitable reactive or non-reactive atmosphere (e.g., plasma, glow discharge, corona discharge, dielectric barrier discharge or atmospheric pressure discharge); chemical pretreatment; or flame pretreatment. A separate adhesion promotion layer may also be formed between the major surface of the substrate and the multilayer barrier assembly. The adhesion promotion layer can be, for example, a separate polymeric layer or a metal-containing layer such as a layer of metal, metal oxide, metal nitride or metal oxynitride. The adhesion promotion layer may have a thickness of a few nanometers (nm) (e.g., 1 or 2 nm) to about 50 nm, or more. In some embodiments, one side (that is, one major surface) of the substrate can be treated to enhance adhesion to the multilayer barrier assembly, and the other side (that is, major surface) can be treated to enhance adhesion to a device to be covered or an encapsulant (e.g., EVA) that covers such a device. Some useful substrates that are surface treated (e.g., with solvent or other pretreatments) are commercially available, for example, from Du Pont Teijin.

For some substrates that are polymer films, both sides are surface treated (e.g., with the same or different pretreatments), and for other substrates only one side is surface treated.

Composite articles according to the present disclosure may further comprise an optional cover layer (e.g., a weatherable top sheet), which may be mono- or multi-layered. In some embodiments, this optional cover layer is preferably flexible and transmissive to visible and/or infrared light and comprises organic film-forming polymers, although this is not a requirement. Useful materials that can form weatherable sheets include polyesters, polycarbonates, polyethers, polyimides, polyolefins, fluoropolymers, and combinations thereof. In embodiments wherein the electronic device is, for example, a solar device, it is typically desirable for the cover layer to be resistant to degradation by ultraviolet (UV) light and weatherable. Photo-oxidative degradation caused by UV light (e.g., in a range from 280 to 400 nm) may result in color change and deterioration of optical and mechanical properties of polymer films. The weatherable sheets described herein can provide, for example, a durable, weatherable topcoat for a photovoltaic device. The substrates are generally abrasion and impact resistant and can prevent degradation of, for example, photovoltaic devices when they are exposed to outdoor elements.

Useful materials for the optional cover layer include ethylene-tetrafluoroethylene copolymers (ETFE), ethylene-chlorotrifluoroethylene copolymers (ECTFE), tetrafluoroethylene-hexafluoropropylene copolymers (FEP), tetrafluoroethylene-perfluorovinyl ether copolymers (PFA, MFA), tetrafluoroethylene-hexafluoropropylene-vinylidene fluoride copolymers (THV), polyvinylidene fluoride homo- and copolymers (PVDF), blends thereof, and blends of these and other fluoropolymers. Fluoropolymers typically comprise homo or copolymers of ethylene, alpha-olefins, vinyl ethers, tetrafluoroethylene (TFE), chlorotrifluoroethylene (CTFE), vinylidene difluoride (VDF), hexafluoropropylene (HFP), other fully fluorinated or partially fluorinated olefinic monomers, or other halogen-containing olefinic monomers. Many of these fluoropolymers are resistant to degradation by UV light in the absence of ultraviolet light absorbers (UVA), hindered amine light stabilizers (HALS), and anti-oxidants.

In some embodiments, useful flexible, visible and infrared light-transmissive cover layers comprise multilayer films having one or more fluorinated polymer (i.e., fluoropolymer) layers. Multilayer films may have different fluoropolymers in different layers or may include at least one layer of fluoropolymer and at least one layer of a non-fluorinated polymer. Multilayer films can comprise a few layers (e.g., at least 2 or 3 layers) or can comprise at least 100 layers (e.g., in a range from 100 to 2000 total layers or more).

Many useful fluoropolymers and/or fluoropolymer films can be commercially obtained, for example, from E.I. du Pont de Nemours and Co., Wilmington, Del., as TEFZEL ETFE and TEDLAR, and films made from resins available from Dyneon LLC, Oakdale, Minn., under the trade designations DYNEON ETFE, DYNEON THV, DYNEON FEP, and DYNEON PVDF, from St. Gobain Performance Plastics, Wayne, N.J., as NORTON ETFE, from Asahi Glass as CYTOPS, and from Denka Kagaku Kogyo KK, Tokyo, Japan as DENKA DX FILM.

Cover Layers comprising fluoropolymers can also include non-fluorinated materials. For example, a blend of polyvinylidene fluoride and polymethyl methacrylate can be used.

Some useful cover layers other than fluoropolymers are reported to be resistant to degradation by UV light in the absence of added UVA, HALS, and/or antioxidants. For example, certain resorcinol isophthalate/terephthalate copolyarylates, for example, those described in U.S. Pat. No. 3,444,129 (Young, Jr. et al.); U.S. Pat. No. 3,460,961 (Young, Jr. et al.); U.S. Pat. No. 3,492,261 (Young, Jr. et al.); and U.S. Pat. No. 3,503,779 (Young, Jr. et al.) are reported to be weatherable. Certain weatherable multilayer articles containing layers comprising structural units derived from a 1,3-dihydroxybenzene organodicarboxylate are reported in PCT Pat. Publ. No. WO 2000/061664 (Pickett et al.), and certain polymers containing resorcinol arylate polyester chain members are reported in U.S. Pat. No. 6,306,507 (Brunelle et al.). Block polyester-co-carbonates comprising structural units derived from at least one 1,3-dihydroxybenzene and at least one aromatic dicarboxylic acid formed into a layer and layered with another polymer comprising carbonate structural units are reported in U.S. Pat. Appl. Pub. No. 2004/0253428 (Wang et al.).

The optional cover layer can be treated to improve adhesion (e.g., to a pressure-sensitive adhesive). Useful surface treatments include electrical discharge in the presence of a suitable reactive or non-reactive atmosphere (e.g., plasma, glow discharge, corona discharge, dielectric barrier discharge or atmospheric pressure discharge); chemical pretreatment (e.g., using alkali solution and/or liquid ammonia); flame pretreatment; or electron beam treatment. A separate adhesion promotion layer may also be formed between the major surface of the cover layer and the PSA. In some embodiments, the cover layer may be a fluoropolymer sheet that has been coated with a PSA and subsequently irradiated with an electron beam to form a chemical bond between the sheet and the pressure sensitive adhesive; see, e.g., U.S. Pat. No. 6,878,400 (Yamanaka et al.). Some useful fluoropolymer sheets that are surface treated are commercially available, for example, from St. Gobain Performance Plastics as NORTON ETFE.

In some embodiments, the cover layer has a thickness from about 0.01 mm to about 1 mm, in some embodiments, from about 0.025 mm to about 0.25 mm or from 0.025 mm to 0.15 mm.

The cover layer may be adhered to the top polymer layer by an optional adhesive layer, preferably a pressure-sensitive adhesive (PSA) layer. For example, PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

PSAs useful for practicing the present disclosure typically do not readily flow and have sufficient barrier properties to provide slow or minimal infiltration of oxygen and moisture through the adhesive bond line, although this is not a requirement. Also, the PSAs disclosed herein are generally transmissive to visible and infrared light such that they do not interfere with absorption of visible light, for example, by photovoltaic cells. The PSAs may have an average transmission over the visible portion of the spectrum of at least about 75 percent (in some embodiments at least about 80, 85, 90, 92, 95, 97, or 98 percent) measured along the normal axis. In some embodiments, the PSA has an average transmission over a range of 400 nm to 1400 nm of at least about 75 percent (in some embodiments at least about 80, 85, 90, 92, 95, 97, or 98 percent). Exemplary PSAs include acrylics, silicones, polyisobutylenes, polyurethanes, polyureas, and combinations thereof. Some useful commercially available PSAs include UV curable PSAs such as those available from Adhesive Research, Inc., Glen Rock, Pa., as ARCLEAR 90453 and ARCLEAR 90537, and acrylic optically clear PSAs available, for example, from 3M Company, St. Paul, Minn. as OPTICALLY CLEAR LAMINATING ADHESIVE 8171, OPTICALLY CLEAR LAMINATING ADHESIVE 8172CL, and OPTICALLY CLEAR LAMINATING ADHESIVE 8172PCL.

Optionally, one or more stabilizers may be added to the cover layer and/or adhesive layer to further improve resistance to UV light. Examples of such stabilizers include at least one of ultraviolet light absorbers (UVAs) (e.g., red shifted UV absorbers), hindered amine light stabilizers (HALS), or anti-oxidants. In some embodiments, the cover layer need not include a UVA or HALS. Exemplary UVAs include benzophenone compounds (e.g., 2-hydroxy-4-octoxybenzophenone, and 2-hydroxy-methoxy-5-sulfobenzophenone), benzotriazole compounds (e.g., 2-(2'-hydroxy-5-methylphenyl)benzotriazole. Exemplary HALS compounds include phenyl salicylate and p-(t-butyl)phenyl salicylate. Normally, the UVA and/or HALS component(s) is/are added in an amount of 1-50 weight percent based on the total weight of the polymer or polymerized components of the cover layer or adhesive layer. Further details concerning suitable UVA and HALS compounds, and antioxidants can be found in U.S. Pat. Appl. Publ. No. 2012/0003448 A1 (Weigel et al.).

In some embodiments, the composite articles of the present disclosure are encapsulated solar devices. In such embodiments, it is typically desirable for the cover layer to be resistant to degradation by ultraviolet (UV) light and weatherable. Photo-oxidative degradation caused by UV light (e.g., in a range from 280 to 400 nm) may result in color change and deterioration of optical and mechanical properties of polymeric films. The optional cover layer described herein can provide, for example, a durable, weatherable topcoat for a photovoltaic device. The cover layers are generally abrasion and impact resistant and can prevent degradation of, for example, photovoltaic devices when they are exposed to outdoor elements.

In some exemplary embodiments, electronic devices can be encapsulated directly with the methods described herein. For example, the devices can be attached to a flexible carrier substrate, and a mask can be deposited to protect electrical connections from inorganic barrier layer(s), polymer layer (s), or other layer(s) during their deposition. The inorganic barrier layer(s), polymer layer(s), and other layer(s) making up the multilayer barrier assembly can be deposited as described elsewhere in this disclosure, and the mask can then be removed, exposing the electrical connections.

In one exemplary direct deposition or direct encapsulation embodiment, the moisture-sensitive device is a moisture-sensitive electronic device. The moisture-sensitive electronic device can be, for example, an organic, inorganic, or hybrid organic/inorganic semiconductor device including, for example, a photovoltaic device such as a copper indium gallium (di)selenide (CIGS) solar cell; a display device such as an organic light emitting display (OLED), electrochromic display, electrophoretic display, or a liquid crystal display (LCD) such as a quantum dot LCD display; an OLED or other electroluminescent solid state lighting device, or a combination thereof. The multilayered barrier assembly may be highly transmissive to visible light, although this is not a requirement.

In some embodiments, composite articles including multilayer barrier assemblies according to the present disclosure include solar devices (e.g., a photovoltaic cell). In photovoltaic cells, the multilayer barrier assembly may be disposed on a photovoltaic cell. Suitable solar cells include those that have been developed with a variety of materials each having a unique absorption spectra that converts solar energy into electricity. Each type of semiconductor material will have a characteristic band gap energy which causes it to absorb light most efficiently at certain wavelengths of light, or more precisely, to absorb electromagnetic radiation over a portion of the solar spectrum. Examples of materials used to make solar cells and their solar light absorption band-edge wavelengths include: crystalline silicon single junction (about 400 nm to about 1150 nm), amorphous silicon single junction (about 300 nm to about 720 nm), ribbon silicon (about 350 nm to about 1150 nm), CIS (Copper Indium Selenide) (about 400 nm to about 1300 nm), CIGS (Copper Indium Gallium di-Selenide) (about 350 nm to about 1100 nm), CdTe (about 400 nm to about 895 nm), GaAs multi junction (about 350 nm to about 1750 nm). The shorter wavelength left absorption band edge of these semiconductor materials is typically between 300 nm and 400 nm.

In some embodiments, the substrate of the composite article is a polymer film and the substrate is bonded to a photovoltaic cell (e.g., a CIGS cell); for example, by adhesive.

The base polymer and intermediate polymer layers are typically irradiated with UV and visible light during many oxide deposition processes, e.g., sputtering, e-beam, and thermal evaporation that are used during the fabrication/production of the layered barrier assembly. Some of these oxide deposition processes are conducted in oxidative environments (e.g., in the presence of oxygen). The oxide deposition processes can damage the polymer layers. For example, they can cause photodegradation, photo-oxidation, and/or cause chemical transformation leading to new chemical moieties, which may be light absorbing. Furthermore, in use (e.g., to protect electronic devices from moisture) the multilayered barrier assembly may be subjected to near UV and/or visible light, which can cause further photodegradation and photo-oxidation of polymer layers (e.g., base and/or intermediate polymer layers). This can cause loss of adhesion between polymer layers and adjacent layers, particularly between an oxide layer and a polymer layer onto which the oxide layer was deposited, resulting in a degradation of barrier performance.

Advantageously, polymer layers, which comprise reaction products of the di(meth)acrylates of Formula I according to the present disclosure provide substantially improved resistance to UV and/or visible light photodegradation and/or photo-oxidation, and improve the durability of the composite articles.

In addition, barrier film assemblies according to the present disclosure may have other beneficial properties such as high transmission of visible light, reduced water vapor transmission rate (WVTR) and/or Oxygen transmission rate (OTR), for example. Multilayer barrier assemblies in composite articles according to the present disclosure can have an oxygen transmission rate (OTR) less than about 0.1 cc/m$^2$-day, less than about 0.05 cc/m$^2$-day, less than 0.01 cc/m$^2$-day, less than about 0.005 cc/m$^2$-day, or even less than about 0.0005 cc/m$^2$-day, at 23° C. and 100 percent relative humidity, wherein "cc" means cubic centimeter. Multilayer barrier assemblies in composite articles according to the present disclosure can have an oxygen transmission rate (OTR) less than about 0.1 cc/m$^2$-day, less than about 0.05 cc/m$^2$-day, less than 0.01 cc/m$^2$-day, less than 0.008 cc/m$^2$-day, less than about 0.005 cc/m$^2$-day, or even less than about 0.0005 cc/m$^2$-day, at 23° C. and 0 percent relative humidity.

Likewise, multilayer barrier assemblies in composite articles according to the present disclosure can have a water vapor transmission rate (WVTR) less than about 0.05, 0.01, 0.005, 0.0005, or 0.00005 g/m$^2$-day at 50° C. and 100% Relative Humidity. In addition, multilayer barrier assemblies in composite articles and barrier films according to the present disclosure can have an average spectral light transmission of 75, 80, 82, 84, 85, 86, 87, 88, 89, 90, 92, 95, 97, 98% as measured on a UV-Visible light spectrometer at an angle of incidence of 0° and by averaging the percent light transmission from 400 nm to 700 nm.

Further details concerning processes suitable for making composite articles according to the present disclosure can be found, for example, in U.S. Pat. No. 5,440,446 (Shaw et al.); U.S. Pat. No. 5,877,895 (Shaw et al.); U.S. Pat. No. 6,010,751 (Shaw et al.); and U.S. Pat. No. 7,018,713 (Padiyath et al.). In one presently preferred embodiment, the barrier assembly in an article or film can be fabricated by deposition of the various layers onto the substrate, in a roll-to-roll vacuum chamber similar to the system described in U.S. Pat. No. 5,440,446 (Shaw et al.) and U.S. Pat. No. 7,018,713 (Padiyath, et al.).

SELECT EMBODIMENTS OF THE PRESENT DISCLOSURE

In a first embodiment, the present disclosure provides a composite article comprising:
  a substrate;
  a multilayer barrier assembly bonded to the substrate, the multilayer barrier assembly comprising:
    a base polymer layer adjacent to the substrate, wherein the base polymer layer comprises a polymerized reaction product of polymerizable components comprising at least one di(meth)acrylate represented by the formula wherein:
each $R^1$ independently represents H or methyl;
each $R^2$ independently represents an alkyl group having from 1 to 4 carbon atoms, or any two geminal $R^2$ groups may together form an alkylene group having from 2 to 7 carbon atoms; and
x and z independently represent 0, 1, 2, 3, or 4, with the provisos that at least one of x and z is not zero, and that $1 \leq x+z \leq 4$; and
a base inorganic barrier layer bonded to the base polymer layer; and
a top polymer layer bonded to the multilayer barrier assembly opposite the substrate.

In a second embodiment, the present disclosure provides a composite article according to the first embodiment, wherein the multilayer barrier assembly further comprises an intermediate polymer layer bonded to the base inorganic barrier layer and an intermediate inorganic barrier layer bonded to the intermediate polymer layer.

In a third embodiment, the present disclosure provides a composite article according to the first or second embodiment, wherein the substrate comprises a flexible transparent polymer film.

In a fourth embodiment, the present disclosure provides a composite article according to any of the first to third embodiments, wherein the base polymer layer comprises a polymerized reaction product of polymerizable components comprising at least 50, 60, 70, 80, or 90 or 95 percent by weight of said at least one di(meth)acrylate.

In a fifth embodiment, the present disclosure provides a composite article according to any of the first to fourth embodiments, wherein the base inorganic barrier layer comprises at least one of silicon oxide, aluminum oxide, or silicon aluminum oxide.

In a sixth embodiment, the present disclosure provides a composite article according to any of the first to fifth embodiments, wherein $R^1$ is H and $R^2$ is methyl.

In a seventh embodiment, the present disclosure provides a composite article according to any of the first to sixth embodiments, wherein x=0, 1, or 2; and z=0, 1, or 2; and x+z=1 or 2.

In an eighth embodiment, the present disclosure provides a composite article according to any of the first to seventh embodiments, wherein the top polymer layer comprises a (meth)acrylic polymer (e.g., a (meth)acrylic polymer having a glass transition temperature of at least 80° C.).

In a ninth embodiment, the present disclosure provides a composite article according to the eighth embodiment, wherein the (meth)acrylic polymer is formed from the polymerization of monomers comprising (meth)acrylates that contain cycloaliphatic groups, wherein the ring(s) structure, exclusive of substituents, is composed of 6 to 12 atoms chosen from C, N, O, and S.

In a tenth embodiment, the present disclosure provides a composite article according to any of the first to ninth embodiments, further comprising an adhesion-modifying layer disposed between the top polymer layer and the substrate.

In an eleventh embodiment, the present disclosure provides a composite article according to the tenth embodiment, wherein the adhesion-modifying layer comprises an adhesion-promoting layer.

In a twelfth embodiment, the present disclosure provides a composite article according to any of the first to eleventh embodiments, further comprising an adhesive layer disposed on the top polymer layer.

In a thirteenth embodiment, the present disclosure provides a composite article according to any of the first to twelfth embodiments, further comprising a cover layer disposed opposite the substrate.

In a fourteenth embodiment, the present disclosure provides a composite article according to any of the first to thirteenth embodiments, wherein the substrate comprises at least one of a polymer film, an electronic display, an electronic light source, a thin film transistor, or a photovoltaic device.

In a fifteenth embodiment, the present disclosure provides a method of making a composite article, the method comprising sequentially:
disposing a multilayer barrier assembly on a substrate, wherein the multilayer barrier assembly comprises:
a base polymer layer adjacent to the substrate, wherein the base polymer layer comprises a polymerized reaction product of polymerizable components comprising at least one di(meth)acrylate represented by the formula wherein:
each $R^1$ independently represents H or methyl;
each $R^2$ independently represents an alkyl group having from 1 to 4 carbon atoms, or any two geminal $R^2$ groups may together form an alkylene group having from 2 to 7 carbon atoms; and
x and z independently represent 0, 1, 2, 3, or 4, with the provisos that at least one of x and z is not zero, and that $1 \leq x+z \leq 4$; and
a base inorganic barrier layer bonded to the base polymer layer, wherein the multilayer barrier assembly has an outermost inorganic barrier layer opposite the substrate; and
bonding a top polymer layer to the outermost inorganic barrier layer.

In a sixteenth embodiment, the present disclosure provides a method according to the fifteenth embodiment, wherein the multilayer barrier assembly further comprises an intermediate polymer layer bonded to the base inorganic barrier layer and an intermediate inorganic barrier layer bonded to the intermediate polymer layer.

In a seventeenth embodiment, the present disclosure provides a method according to the fifteenth or sixteenth embodiment, wherein the base inorganic barrier layer is sputter deposited on the base polymer layer while the base polymer layer is bonded to the substrate.

In an eighteenth embodiment, the present disclosure provides a method according to any of the fifteenth to seventeenth embodiments, further comprising disposing an adhesion-modifying layer between the top polymer layer and the substrate.

In a nineteenth embodiment, the present disclosure provides a method according to the eighteenth embodiment, wherein the adhesion-modifying layer comprises an adhesion-promoting layer.

In a twentieth embodiment, the present disclosure provides a method according to any of the fifteenth to the nineteenth embodiments, further comprising disposing an adhesive layer on the top polymer layer.

In a twenty-first embodiment, the present disclosure provides a method according to any of the fifteenth to twentieth embodiments, further comprising disposing a cover layer opposite the substrate.

In a twenty-second embodiment, the present disclosure provides a method according to any of the fifteenth to twenty-first embodiments, wherein the substrate comprises at least one of a polymer film, an electronic display, an electronic light source, a thin film transistor, or a photovoltaic device.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In the Examples, the abbreviation "NM" means not measured".

Polymerizable acrylates used to form the base and top polymer layers in the Examples are reported in Table 1, below.

TABLE 1

| ABBREVIATION | DESCRIPTION |
| --- | --- |
| HPNDA | Hydroxypivalic acid neopentyl glycol diacrylate, available as MIRAMER M210 from Miwon Specialty Co., Ltd., Korea; 45-60 wt. % of diacrylate of hydroxypivalate mono-ester of neopentyl glycol, MW = 312 g/mole; 10-15 wt. % of compound of Formula 1, MW = 412 g/mole, $R^1$ = H, $R^2$ = methyl (x = 0 and z = 2, and/or x = 1 and z = 1, and/or x = 2 and z = 0); and 15-20 wt. % of neopentyl glycol diacrylate as determined by Ultra-High Pressure Liquid Chromatography with UV detection at 210 nm and Time of Flight-Mass Spectrometry |
| PDOME | 2-propenic acid, [2-[1,1-dimethyl-2-[(1-oxo-2-propenyl)oxy]ethyl]-5-ethyl-1,3-dioxan-5-yl] methyl ester, available as KAYARAD R-604 from Nippon Kayaku Co., Ltd., Tokyo, Japan |
| NPGDA | Neopentyl glycol diacrylate, available as SR247 from Sartomer USA, LLC, Exton, Pennsylvania |
| TMPTA | Trimethylolpropane triacrylate, available as SR351 from Sartomer USA, LLC |
| IBA | Isobornyl acrylate, available as SR506A from Sartomer USA, LLC |
| TCDD | Tricyclodecanedimethanol diacrylate, available as SR833S from Sartomer USA, LLC |
| K90 | 3-(acryloxyethyloxycarbonylamino)propyltrimethoxysilane prepared generally as described in Preparative Example 5 of PCT Pat. Publ. No. WO 2014/025387 A1 (Klun et al.) |

Sample Construction & Test Methods
Laminate Construction (LC) Method

Composite barrier films of Examples 1-2 and Comparative Examples A-K were laminated to a 0.05 mm (0.002 in) thick ethylene tetrafluoroethylene (ETFE, ethylene-tetrafluoroethylene film available as NORTON ETFE from St. Gobain Performance Plastics, Wayne, N.J.) polymer sheet using a 0.05 mm (0.002 in) thick pressure-sensitive adhesive (PSA) containing a UV absorber (available as 3M OPTICALLY CLEAR ADHESIVE 8172PCL from 3M Company, St. Paul). The PSA blocks almost all of the UV-B irradiation and most of the LV-A irradiation with partial transmission as wavelengths approach 400 nm. At wavelengths in the visible region greater than 410 nm, transmission is greater than 90%. The PSA was first laminated to the ETFE film. Then a 1 inch (2.54 cm) wide piece of tape (available as 3M Polyester Tape 8403 from 3M Company) was placed adhesive side up on the top polymer layer of the composite barrier film along a cut edge of the composite barrier film that ran cross-web. The ETFE/PSA construction was then laminated to the composite barrier film such that the top acrylate polymer was adjacent to the PSA. Thus, laminate constructions were made, where the top polymer layer of the composite barrier film was adjacent to the PSA. The tape served to keep the ETFE/PSA and composite barrier film unattached along one edge of the laminate construction. This provided tabs that could be secured in the grips of a tensile testing Instron machine for subsequent T-peel testing.

Simulated Solar Module (SSM) Construction Method

A Laminate Construction (LC) was prepared as described above for Examples 1-2 and Comparative Examples A-K. The LC was cut to 6.5 in (16.5 cm)×9.5 in (24.1 cm). Two LCs were prepared in this manner. One LC (the bottom LC) was of the same composition and construction of that of Comparative Example A LC (TCDD as the acrylate to form the base polymer layer and 94 wt. % TCDD plus 6 wt. % K90 to form the top polymer layer). This LC served to protect the underside of the SSM and was not subject to subsequent weathering evaluation. The other LC (the top LC) contained the Example or Comparative Example composite barrier film that would be evaluated. The bottom LC was placed ETFE-side down onto a flat, clean working surface. A 5.5 in (14 cm)×8.5 in (21.6 cm), 0.015 in (0.38 mm) thick encapsulant film (commercially available as JURASOL from JuraFilms, Downer Grove, Ill.) was centered on top of the bottom LC.

Next, a 5.5 in (14 cm)×8.5 in (21.6 cm), 0.0056 in (0.14 mm) thick, polytetrafluoroethylene (PTFE)-coated aluminum foil (available as 8656K61 from McMaster-Carr, Santa Fe Springs, Calif.) was placed on top of the encapsulant film with the aluminum-side down and PTFE-side up. A hot melt adhesive edge tape (available as HELIOSEAL PVS-101A from Kommerling Chemische Fabrik GMBH, Pirmasens, Germany) that was approximately 1 mm thick and 12 mm wide was placed around the perimeter of the foil and underlying encapsulant film, and onto the exposed or uncovered surface of the bottom LC, thus framing the foil and underlying encapsulant film. Finally, the other LC (the top LC), which contained the LC that would be evaluated by Damp Heat Aging and subsequent T-peel testing was placed on top with the PET-side of this LC adjacent to the PTFE-coated aluminum foil. The resulting multi-component construction was vacuum laminated at 150° C. for 12 min to form the 6.5 in (16.5 cm)×9.5 in (24.1 cm) SSM.

Accelerated Light Aging Method

LCs were razor-cut to approximately 7 cm×14 cm rectangular pieces and mounted in a metal fixture which held the sample and also blocked light from entering through the backside or PET-side of the LC. Black anodized aluminum was also placed between the backside of the LC sample and fixture. Light entered through the front or top side, i.e., the ETFE-side, of the LC. Mounted LC samples were aged for 200, 400, 600, and in some cases 1000 hours (hr) as follows. The air-filled environmental chamber was held at 65° C. and 15% Relative Humidity. Radiation was provided by a xenon arc lamp through ASTM D7869 daylight filters. The irradiance was controlled such that at 340 nm, the spectral irradiance after the daylight filters was 1.3 (W/m$^2$)/nm. When the lamp was on a black plate in the chamber had a temperature of approximately 90° C.

Damp Heat Aging Method

SSM's were aged for 500 and 1000 hours in the dark in an air-filled environmental chamber set to conditions of 85° C. and 85% Relative Humidity (model SE-1000-3, Thermotron Industries, Holland, Mich.).

T-Peel Adhesion Test for Light Aged LCs

Unaged and light-aged LCs were razor-cut into 0.5 in (1.27 cm) wide strips. The strips were peel tested per ASTM D1876-08 T-peel test method. The strips were peeled by a peel tester (commercially available under the trade designation "INSIGHT 2 SL" with Testworks 4 software from MTS, Eden Prairie, Minn.) with a 10 in/min (25.4 cm/min) peel rate. The strips were peeled in the web or machine direction with reference to the web-based, vapor coating process used to fabricate the composite barrier films (see COMPARATIVE EXAMPLE A, General Procedure A for Making Composite Barrier Films). The peel strength for an individual strip was taken as the average of the peel strength from approximately 1.3 to 15.1 cm of extension. The reported average peel strength value is the average of 4 peel strengths of 4 strips.

T-Peel Adhesion Test for Damp Heat Aged SSMs

Unaged and damp heat aged SSMs were disassembled by cutting the top LCs away from the PTFE-coated aluminum foil (and edge tape). Then, these top LCs were razor-cut into 1.0 inch (2.54 cm) wide strips and peel tested according to ASTM D1876-08 T-peel test method. The strips were peeled by a peel tester (available as INSIGHT 2 SL with TESTWORKS 4 software from MTS, Eden Prairie, Minn.) with a 10 in/min (25.4 cm/min) peel rate. The strips were peeled in the web or machine direction with reference to the web-based, vapor coating process used to fabricate the composite barrier films (see COMPARATIVE EXAMPLE A, General Procedure A for Making Composite Barrier Films). The peel strength for an individual strip was taken as the average of the peel strength from approximately 1.3 to 15.1 cm of extension. The reported average peel strength value is the average of 4 peel strengths of 4 strips.

Water Vapor Transmission Rate Test

Water vapor transmission rates of composite barrier films were measured in accordance with ASTM F-1249 at 50° C. and 100% relative humidity (RH) with a MOCON PERMATRAN-W Model 700 WVTR testing system from MOCON, Inc. (Minneapolis, Minn.). The lower detection limit of this instrument was 0.005 (g/m$^2$)/day.

Oxygen Transmission Rate Test

Oxygen transmission rates of composite barrier films were measured in accordance with ASTM D-3985 at 23° C. and 0% relative humidity (RH) with an OX-TRAN permeability testing model 702 from MOCON, Inc. (Minneapolis, Minn.). The lower detection limit of this instrument was 0.010 (cc/m$^2$)/day or 0.010 (cubic centimeters/m$^2$)/day.

Light Transmission Test

The average spectral light transmission, $T_{vis}$, of composite barrier films was measured with a UV-Vis spectrometer at a 0° angle of incidence by averaging the percent light transmission between 400 nm and 700 nm.

Comparative Example A

General Procedure A for Making Composite Barrier Films as described below was carried out to make composite barrier film of Comparative Example A. The choice of acrylates that made the base and top polymer layers and their respective flow rates through the ultrasonic atomizers were specific to Comparative Example A.

A roll of heat-stabilized PET film substrate, 5 mil (0.127 mm) thick and available as XST 6642 from E. I. du Pont de Nemours and Co. (Wilmington, Del.), was loaded into a roll-to-roll vacuum processing chamber. The chamber was pumped down to a pressure of $1\times10^{-5}$ torr (1.3 mPa). The web speed was maintained at 4.8 meter/min while maintaining the backside of the film in contact with a coating drum chilled to $-10°$ C. With the backside of the film in contact with the drum, a multilayer barrier assembly and top polymer layer were produced on the front side. With the film in contact with the drum, the film surface was treated with a nitrogen plasma at 0.02 kW of plasma power. The film surface was then coated with TCDD. The TCDD was degassed under vacuum to a pressure of 20 millitorr (2.7 Pa) prior to coating, loaded into a syringe pump, and pumped at a flow rate of 1.33 mL/min through an ultrasonic atomizer operated at a frequency of 60 kHz into a heated vaporization chamber maintained at 260° C. The resulting monomer vapor stream condensed onto the film surface and was polymerized or cured using a multi-filament electron-beam cure gun operated at 7.0 kV and 4 mA to form a cured acrylate layer, i.e., the base polymer layer, of approximately 720 nm in thickness.

Immediately after the acrylate deposition and cure, and with the film still in contact with the drum and at the same web speed, a $Si_pAl_qO_r$ layer was sputter-deposited atop the desired length (23 m) of the base polymer layer. One alternating current (AC) power supply was used to control one pair of cylindrical rotating cathodes; housing two 90% Si/10% Al targets (commercially available from Soleras Advanced Coatings, Deinze, Belgium). During sputter deposition, the voltage signal from the power supply was used as an input for a proportional-integral-differential control loop to maintain a predetermined oxygen flow to each cathode. The AC power supply sputtered the 90% Si/10% Al targets using 16000 watts of power, with a gas mixture containing 350 sccm argon and 190 sccm oxygen at a sputter pressure of 3.5 millitorr (0.47 Pa). This provided a $Si_pAl_qO_r$ base inorganic barrier layer of approximately 24 nm in thickness deposited atop the base polymer layer.

Immediately after the $Si_pAl_qO_r$ base inorganic barrier layer deposition and with the film still in contact with the drum, a second acrylate composition consisting of 94 wt. % of TCDD and 6 wt. % of K90, was coated and cured on the same 23 meter length of web where the $Si_pAl_qO_r$ had been deposited using the same general conditions as for the base polymer layer, except that the electron beam polymerization or cure was carried out using a multi-filament electron-beam cure gun operated at 7 kV and 5 mA, resulting in top polymer layer of approximately 720 nm.

Examples 1-2 and Comparative Examples B-K

Composite barrier films of Examples 1-2 and Comparative Examples B-K were made by repeating the General Procedure A for Making Composite Barrier Films as described for Comparative Example A with changes in choice of acrylates and their respective flow rates through the ultrasonic atomizers as specified in Table 2, which also lists monomers and conditions for Comparative Example A for reference.

In Table 2, the Acrylate Monomer listed for the Top Polymer Layer for all the Examples and Comparative Examples constituted 94 weight percent of the acrylate monomers evaporated to form the top polymer layer. The other 6 weight percent was K90. The Flow Rate was of the mixture of the acrylate listed and K90. In the case of the Base Polymer Layer, the Acrylate Monomer(s) listed constituted 100 weight percent of the acrylate monomers evaporated to form the base polymer layer; no K90 was employed.

The inorganic barrier layer thickness was nominally 15-25 nm for Examples 1-2 and Comparative Examples B-K. The procedure for preparing polymerized NPGDA layers in Comparative Examples B, C, G, and H required higher liquid monomer flow rates through the ultrasonic atomizers and thus higher monomer vapor flow rates relative to the liquid and vapor flow rates of other monomers in the other examples in an effort to obtain similar polymer layer thicknesses. NPGDA vapor, with a vapor pressure greater than 20 micrometers Hg (2.7 Pa) at 25° C., did not fully condense on the PET film substrate in the coating of these examples. A significant fraction of the evaporated NPGDA coated other surfaces in the vapor coater, in addition to the polymer substrate.

The average light transmission from 400 nm to 700 nm ($T_{vis}$) and the water vapor transmission rate (WVTR) for the composite barrier films of Examples 1-2 and Comparative Examples A-K are also reported in Table 2 (below). The oxygen (gas) transmission rate (OTR) for the composite barrier films of Examples 1-2 and Comparative Examples A, B, C, I, J, and K are also reported in Table 2 (below).

TABLE 2

| | BASE POLYMER LAYER | | | TOP POLYMER LAYER | | | | | |
|---|---|---|---|---|---|---|---|---|---|
| EXAMPLE | Acrylate Monomer | Flow Rate, mL/min | Nominal Thickness, nanometers | Acrylate Monomer | Flow Rate mL/min | Nominal Thickness, nanometers | $T_{vis}$, percent | WVTR, (g/m²)/day | OTR, (cc/m²)/day |
| 1 | HPNDA | 0.67 | 190-400 | TCDD | 1.33 | 470-990 | 88.7 | <0.005 | <0.010 |
| 2 | HPNDA | 1.33 | 470-990 | TCDD | 1.33 | 470-990 | 87.7 | <0.005 | <0.010 |
| COMP. EX. A | TCDD | 1.33 | 470-990 | TCDD | 1.33 | 470-990 | 89.4 | <0.005 | <0.010 |
| COMP. EX. B | NPGDA | 1.8 | 190-400 | TCDD | 1.33 | 470-990 | 88.1 | <0.005 | <0.010 |
| COMP. EX. C | NPGDA | 2.0 | 190-400 | NPGDA | 2.0 | 470-990 | 88.5 | 0.01 | 0.016 |
| COMP. EX. D | TCDD | 1.33 | 470-990 | TCDD | 1.33 | 470-990 | 89.2 | <0.005 | NM |
| COMP. EX. E | TMPTA | 1.33 | 470-990 | TCDD | 1.33 | 470-990 | 89.1 | <0.005 | NM |
| COMP. EX. F | 70/30 TCDD/IBA | 1.33 | 470-990 | TCDD | 1.33 | 470-990 | 88.2 | NM | NM |
| COMP. EX. G | NPGDA | 1.8 | 190-400 | TCDD | 1.33 | 470-990 | 89.0 | <0.005 | NM |
| COMP. EX. H | NPGDA | 2.0 | 470-990 | NPGDA | 2.0 | 470-990 | 89.4 | 0.01 | NM |
| COMP. EX. I | PDOME | 0.67 | 190-400 | TCDD | 1.33 | 470-990 | 87.0 | <0.005 | <0.010 |
| COMP. EX. J | PDOME | 1.33 | 470-990 | TCDD | 1.33 | 470-990 | 83.6 | <0.005 | <0.010 |
| COMP. EX. K | TCDD | 0.67 | 190-400 | TCDD | 1.33 | 470-990 | 89.5 | <0.005 | <0.010 |

The composite films of Examples 1-2 and Comparative Examples A-K were used to make Laminate Constructions (LCs) as described in the LAMINATE CONSTRUCTION METHOD hereinbefore. These LCs underwent accelerated light aging as described in the ACCELERATED LIGHT AGING METHOD, and then were cut into strips and peel tested as described in the T-PEEL ADHESION TEST FOR LIGHT AGED LCs hereinabove. Results are reported in Table 3, below.

TABLE 3

| EXAMPLE | AVERAGE PEEL STRENGTH, N/cm | | | | |
|---|---|---|---|---|---|
| | 0 hr | 200 hr | 400 hr | 600 hr | 1000 hr |
| 1 | 3.33 | 8.79 | 8.70 | 7.60 | 2.08 |
| 2 | 3.39 | 10.11 | 8.04 | 7.46 | 1.80 |
| COMP. EX. A | 3.53 | 0.06 | 0.03 | 0.04 | 0.01 |
| COMP. EX. B | 3.89 | 9.12 | 8.42 | 8.06 | NM |
| COMP. EX. C | 0.59 | 5.15 | 6.75 | 1.93 | NM |
| COMP. EX. D | 3.13 | 1.02 | 0.21 | 0.04 | NM |
| COMP. EX. E | 3.58 | 0.05 | 0.06 | 0.20 | NM |
| COMP. EX. F | 3.42 | 1.38 | 0.08 | 0.07 | NM |
| COMP. EX. G | 3.62 | 9.71 | 8.10 | 8.44 | 8.33 |
| COMP. EX. H | 2.06 | 10.13 | 7.98 | 3.08 | 3.16 |
| COMP. EX. I | 3.34 | 10.32 | 5.82 | 0.68 | 0.03 |
| COMP. EX. J | 3.32 | 10.02 | 3.83 | 0.06 | 0.02 |
| COMP. EX. K | 3.41 | 0.20 | 0.04 | 0.04 | 0.01 |

LCs were used to make Simulated Solar Modules as described in the SIMULATED SOLAR MODULE (SSM) CONSTRUCTION section, hereinbefore. These SSM's underwent damp heat aging as described in the "Damp Heat Aging" section, and then were cut into strips and peel tested as described in the T-Peel Test for Damp Heat Aged SSMs, hereinbefore. The results are reported in Table 4, below.

TABLE 4

| EXAMPLE | AVERAGE PEEL STRENGTH, N/cm | | |
|---|---|---|---|
| | 0 hr | 500 hr | 1000 hr |
| 1 | 8.39 | 9.80 | 9.91 |
| 2 | 8.60 | 9.87 | 9.82 |
| COMP. EX. A | 7.70 | 9.77 | 10.03 |
| COMP. EX. B | 5.87 | 10.05 | 10.97 |
| COMP. EX. C | 1.09 | 0.32 | 0.18 |
| COMP. EX. D | NM | NM | NM |
| COMP. EX. E | NM | NM | NM |
| COMP. EX. F | 4.03 | 10.16 | 10.22 |
| COMP. EX. G | 7.25 | 10.67 | 11.07 |
| COMP. EX. H | 9.61 | 10.35 | 11.26 |
| COMP. EX. I | 8.53 | 9.91 | 9.87 |
| COMP. EX. J | 8.73 | 9.90 | 9.97 |
| COMP. EX. K | 7.11 | 9.96 | 10.00 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A photovoltaic cell assembly comprising:
a photovoltaic cell;
an adhesive; and
a composite article comprising:
a substrate, and
a multilayer barrier assembly comprising:
a top polymer layer;
an inorganic barrier layer bonded to the top polymer layer; and
a base polymer layer bonded to the inorganic barrier layer and adjacent to the substrate, the base polymer layer comprising:
a polymerized reaction product of polymerizable components, the polymerizable components comprising di(meth)acrylates represented Formula I:

wherein:
each $R^1$ is independently represents H and methyl;
each $R^2$ is independently selected from an alkyl group having from 1 to 4 carbon atoms, and
x and z are independently an integer selected from 0, 1, 2, 3, and 4, with the provisos that at least one of x and z is not zero, and that $1 \leq x+z \leq 2$,
wherein at least 55 wt % of the polymerizable components is comprised of:
(A) a di(meth)acrylate of Formula I wherein each $R^1$ is H, each $R^2$ is methyl, x is 0, and z is 1, and
(B) one or more di(meth)acrylate of Formula I selected from: wherein each $R^1$ is H, each $R^2$ is methyl, x is 0, and z is 2, wherein each $R^1$ is H, each $R^2$ is methyl, x is 1, and z is 1,
and wherein each $R^1$ is H, each $R^2$ is methyl, x is 2, and z is 0, wherein each of the (A) and the (B) are present in the at least 55 wt %,
wherein the substrate is bonded to the photovoltaic cell via the adhesive.

2. The photovoltaic cell assembly of claim 1, wherein the photovoltaic cell is a copper indium gallium (di)selenide (CIGS) solar cell.

3. The photovoltaic cell assembly of claim 1, wherein the photovoltaic cell is an organic photovoltaic device.

4. The photovoltaic cell assembly of claim 1, wherein the photovoltaic cell is a perovskite solar cell.

5. The photovoltaic cell assembly of claim 1, wherein the photovoltaic cell comprises a semiconductor material selected from crystalline silicon, amorphous silicon, copper indium selenide, copper indium gallium di-selenide, cadmium telluride, or gallium arsenide.

6. The photovoltaic cell assembly of claim 1, wherein $R^1$ is H and $R^2$ is methyl.

7. The photovoltaic cell assembly of claim 1, wherein the base polymer layer comprises a polymerized reaction product of polymerizable components comprising at least 50 percent by weight of said at least one di(meth)acrylate.

8. The photovoltaic cell assembly of claim 1, further comprising a cover layer adhesively bonded to the top polymer layer of the multilayer barrier assembly.

9. The photovoltaic cell assembly of claim 8, wherein the cover layer is transparent and resistant to degradation by ultraviolet (UV) light and is weatherable that the cover layer provides a weatherable topcoat for the photovoltaic cell.

10. The photovoltaic cell assembly of claim 8, wherein the cover layer comprises a fluoropolymers that is resistant to degradation by UV light in the absence of ultraviolet light absorbers, hindered amine light stabilizers, and anti-oxidants.

11. The photovoltaic cell assembly of claim 8, wherein the cover layer consists of ethylene-tetrafluoroethylene copolymers.

12. The photovoltaic cell assembly of claim 1, wherein the inorganic barrier layer comprises at least one of silicon oxide, aluminum oxide, or silicon aluminum oxide.

13. The photovoltaic cell assembly of claim 1, wherein the top polymer layer comprises a (meth)acrylic polymer that has a glass transition temperature of at least 110° C.

14. The photovoltaic cell assembly of claim 13, wherein the (meth)acrylic polymer is formed from the polymerization of monomers comprising the di(meth)acrylate of the hydroxypivalate mono-ester of neopentyl glycol.

15. The photovoltaic cell assembly of claim 13, wherein the (meth)acrylic polymer is formed from the polymerization of monomers comprising (meth)acrylates that contain cycloaliphatic groups having 6 to 12 atoms forming the ring(s).

16. The photovoltaic cell assembly of claim 14, wherein the (meth)acrylic polymer is formed from the polymerization of monomers comprising tricyclodecanedimethanol di(meth)acrylate.

17. The photovoltaic cell assembly of claim 1, wherein the base polymer layer has a thickness between 2 nm and 5 microns, the inorganic barrier layer has a thickness between 3 nm and 150 nm, and the top polymer layer has a thickness between 2 nm and 5 microns.

18. The photovoltaic cell assembly of claim 1, wherein the substrate comprises a flexible transparent polymer film.

19. The photovoltaic cell assembly of claim 18, wherein the substrate is a heat-stabilized polyester film.

20. The photovoltaic cell assembly of claim 18, wherein the substrate is a polyimide film.

* * * * *